United States Patent
Jung et al.

(10) Patent No.: US 6,916,074 B2
(45) Date of Patent: Jul. 12, 2005

(54) MAGNETORHEOLOGICAL PEDAL SIMULATOR

(75) Inventors: In-Yong Jung, Incheon (KR); Jae-Hwan Jeon, Suwon-si (KR); Jong-Ho Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/911,708

(22) Filed: Aug. 4, 2004

(65) Prior Publication Data

US 2005/0046273 A1 Mar. 3, 2005

(30) Foreign Application Priority Data

Sep. 3, 2003 (KR) .................................. 10-2003-0061477

(51) Int. Cl.$^7$ .............................................. B60T 7/00
(52) U.S. Cl. .................. 303/3; 188/267.2; 60/545; 74/560; 74/512; 303/20; 303/113.4
(58) Field of Search ....................... 482/903; 303/113.4, 303/20, 3, 15, 155; 188/267.2, 267.1, 267; 74/514, 512, 513, 560; 60/545; 192/99, 21.5; 345/156; 434/45; 73/121

(56) References Cited

U.S. PATENT DOCUMENTS

| | | | | |
|---|---|---|---|---|
| 5,908,373 A | * | 6/1999 | Pitre | 482/57 |
| 6,373,465 B2 | * | 4/2002 | Jolly et al. | 345/156 |
| 6,679,135 B1 | * | 1/2004 | Faigle et al. | 74/512 |
| 2002/0074196 A1 | * | 6/2002 | Park | 188/267.2 |
| 2002/0108463 A1 | * | 8/2002 | Shaw et al. | 74/512 |

FOREIGN PATENT DOCUMENTS

| | | | |
|---|---|---|---|
| DE | 34318233 | * | 3/1986 |
| JP | 2000-280872 | * | 10/2000 |
| WO | WO99/22975 | * | 5/1999 |

* cited by examiner

Primary Examiner—Douglas C. Butler
(74) Attorney, Agent, or Firm—Morgan Lewis & Bockius LLP

(57) ABSTRACT

A torsion spring is equipped to provide a resilient force toward an opposite direction of a manipulation force of a driver's pedal and an magnetorheological damper is equipped to promptly actively attenuate the resilient force of the torsion spring and the manipulation force of the driver's pedal. Thereby, contributing to a wide control range of the reaction force of the pedal, an effective response, and a proper formation of hysteresis of the reaction force of the pedal.

5 Claims, 5 Drawing Sheets

MAGNETORHEOLOGICAL PEDAL SIMULATOR

CROSS-REFERENCE TO RELATED APPLICATIONS

This application claims priority of Korean Application No. 10-2003-0061477, filed on Sep. 3, 2003, the disclosure of which is hereby incorporated by reference herein in its entirety.

FIELD OF THE INVENTION

Generally, the present invention pertains to a pedal simulator of a brake-by-wire system using a rotational magnetorheological damper.

BACKGROUND OF THE INVENTION

Typically, in a brake-by-wire system, an electric-caliper is disposed at each vehicle wheel. The electric-caliper receives a signal from the Electronic Control Unit (ECU) and presses against brake discs without recourse to a mechanical connection between the driver and vehicle wheels.

Since the brake-by-wire system does not require a mechanical connection between the driver and the vehicle wheels, impedance of the brake pedal is minimized. Accordingly, a pedal simulator is controlled to transmit a proper reaction force of a pedal to the driver, thereby assisting the driver's braking operation.

In the pedal simulator, generating a proper reaction force according to braking conditions of the vehicle is the most important task. Therefore, hysteresis of the reaction force of the pedal should be obtained to reduce the fatigue of the driver's foot in the event of a turn or continuous braking. Also, the controllable range of the reaction force and the response in relation to the control should be sufficient and effective, respectively.

SUMMARY OF THE INVENTION

Embodiments of the present invention provide a pedal simulator having a wide control range of the reaction force of the pedal and an excellent response. The pedal simulator is also adapted to properly form the hysteresis of the reaction force of the pedal.

The pedal simulator according to an embodiment of the present invention comprises a base. A pedal is pivotally installed on the base. A magnetorheological damper is equipped between the pedal and base. A torsion spring is equipped between the pedal and base. A rotational angle sensor measures the rotational angle of the pedal in relation to the base. A controller receives a signal of the rotational angle of the pedal from the rotational angle sensor and adjusts the MR damper.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
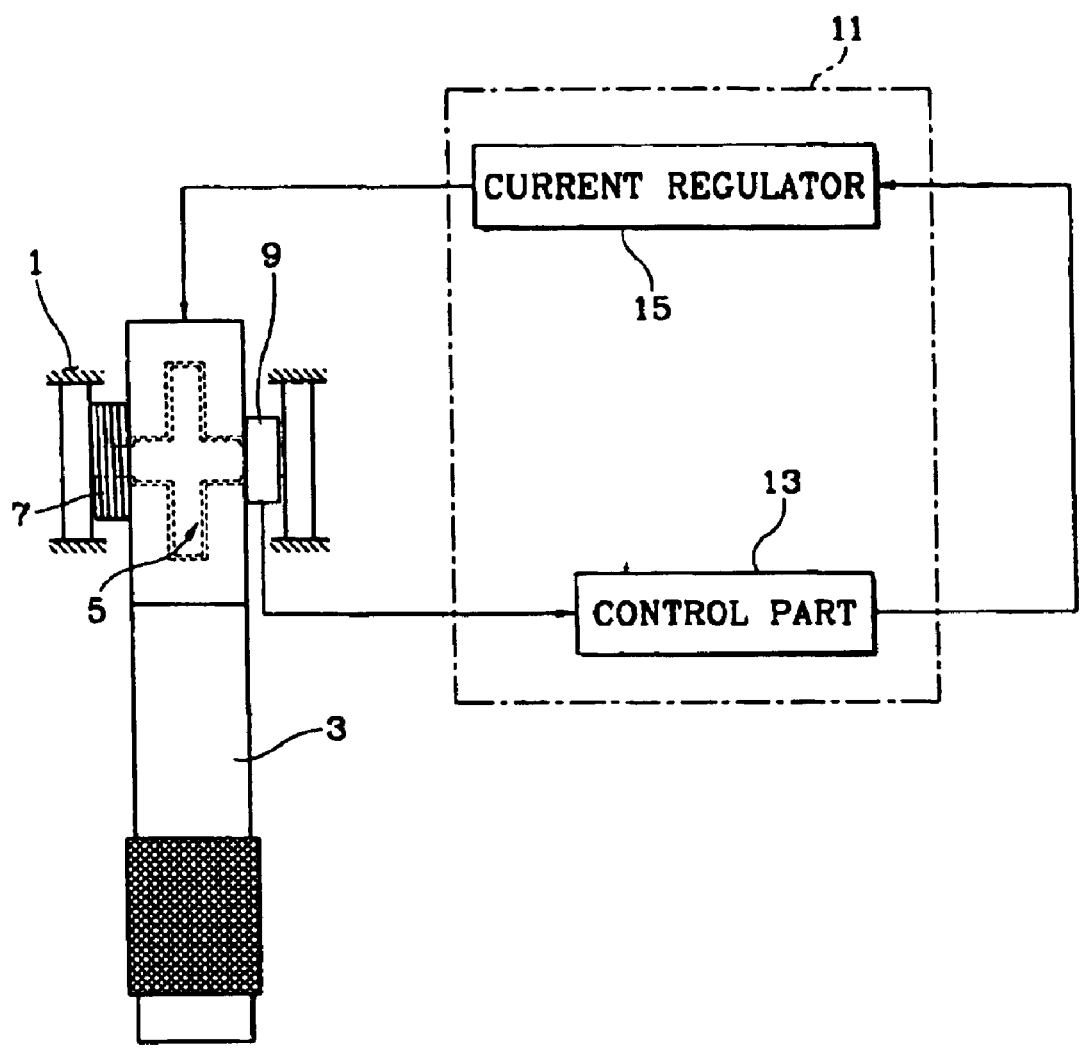
FIG. 1 is a block diagram of a pedal simulator according to an embodiment of the present invention.

Referring to FIG. 1, the pedal simulator according to an embodiment of the present invention comprises a base (1). A pedal (3) is pivotally installed on the base (1) and receives a driver's braking force. A magnetorheological damper (5) is equipped between the pedal (3) and base (1). A torsion spring (7) is equipped between the pedal (3) and base (1). A rotational angle sensor (9) measures the rotational angle of the pedal (3) in relation to the base (1). A controller (11) receives a signal of the rotational angle of the pedal (3) from the rotational angle sensor (9) and adjusts the MR damper (5).

The controller (11) comprises a control part (13) for receiving a signal from the rotational angle sensor (9) and sending a control signal. A current regulator (15) receives the control signal sent from the control part (13) and provides a driving current to the MR damper (5).

Figure 2:
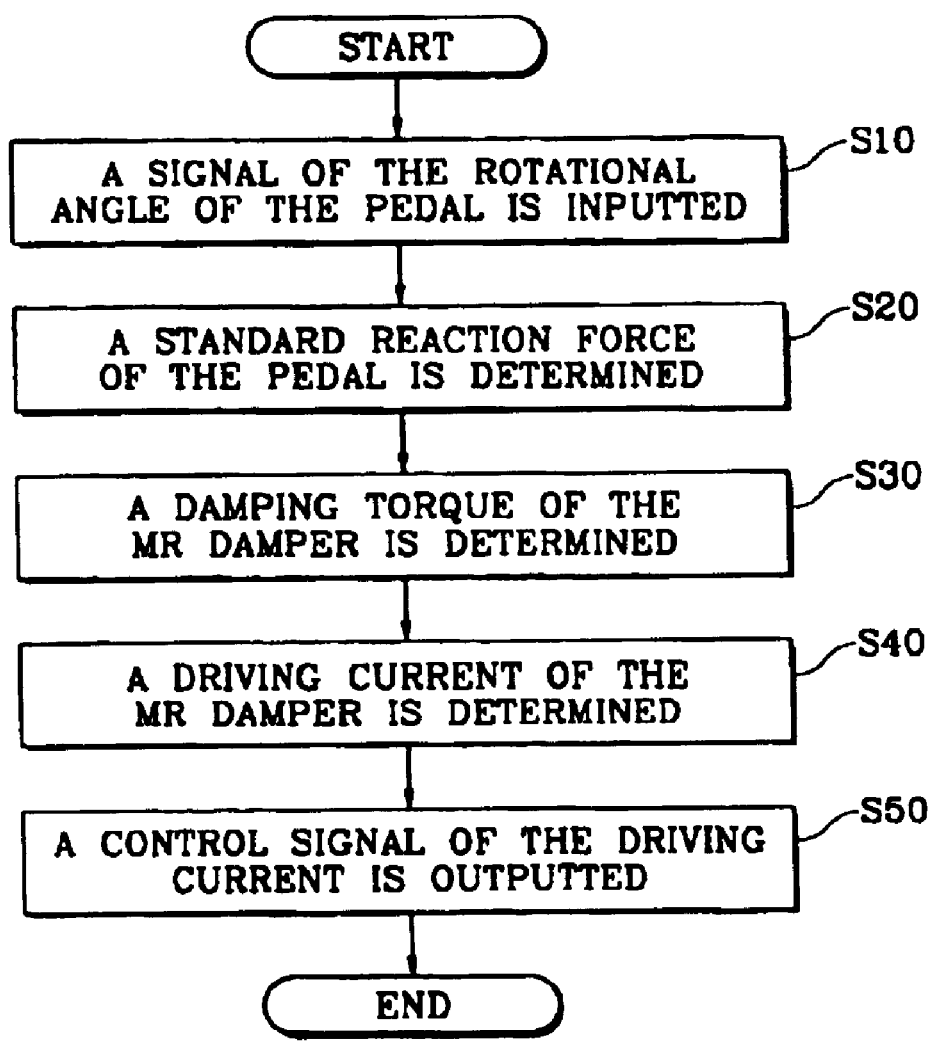
FIG. 2 is a control flowchart of a control part of FIG. 1.

The controlling procedure of the control part (13) is represented in FIG. 2. When a signal of the rotational angle of the pedal (3) is received from the rotational angle sensor (9) to the control part (13, S10), the control part (13) determines a standard reaction force of the pedal on the basis of the received information (S20).

The control part (13) then determines a damping torque of the MR damper for implementing the standard reaction force of the pedal thus determined (S30). The control part (13) also determines a driving current of the MR damper to form the damping torque thus determined (S40). A control signal of the driving current is thus determined (S50) and transmitted to the current regulator (15). The current regulator (15) regulates the MR damper (5) according to the above control signal.

The torsion spring (7) is equipped between the base (1) and the pedal (3) for storing the energy applied to the pedal (3). The torsion spring (7) is disposed parallel to the MR damper (5).

The function of the torsion spring (7) is as follows, if the pedal simulator is embodied only by the MR damper without the torsion spring (7), the energy source provided to the pedal simulator is only the manipulation force of the driver's pedal. However, since the MR damper (5) only disperses the manipulation force of the driver's pedal (3), the pedal (3) can hardly be replaced to its original position. Accordingly, the present invention is provided with the torsion spring (7) in order to store the energy, which is applied to the pedal (3) when the driver depresses the brake pedal. Therefore, the energy can be used as a restoring energy for the pedal (3).

Figure 3:
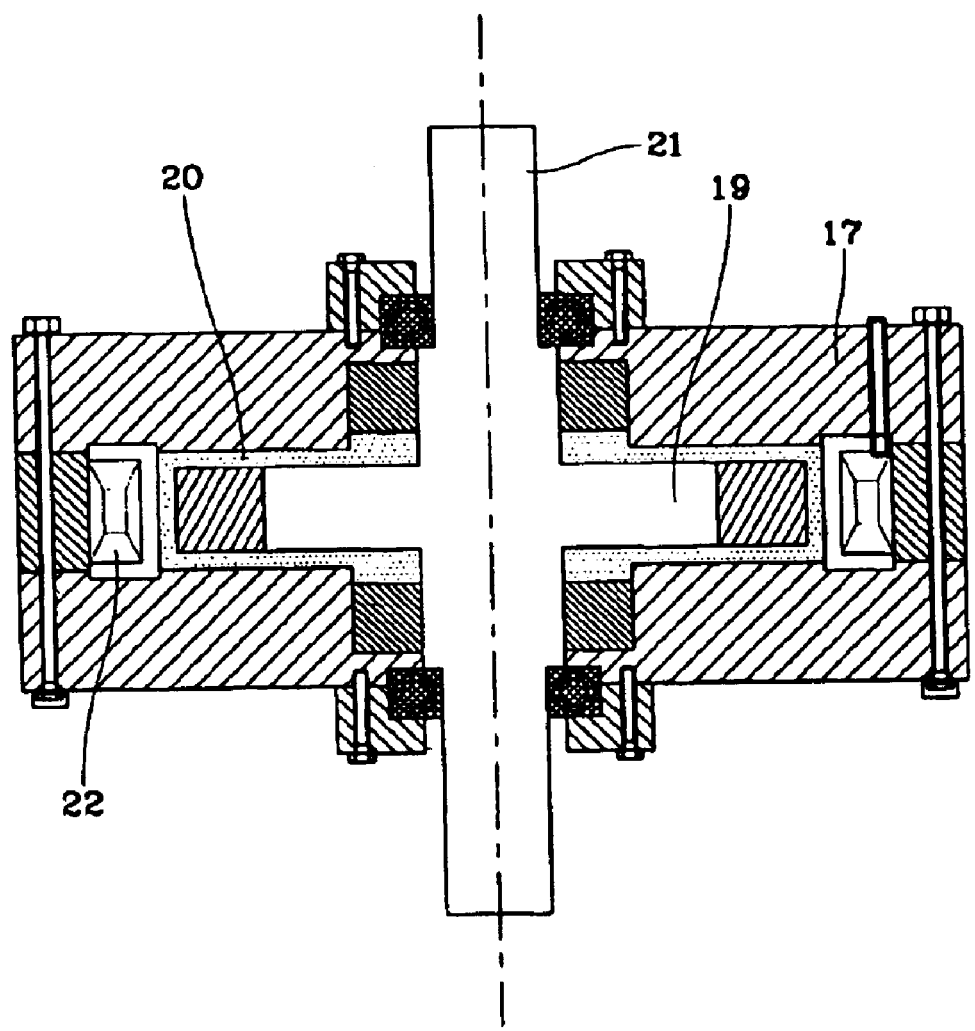
FIG. 3 is a cross sectional view of an MR damper of FIG. 1.

The MR damper (5) comprises a housing (17) and a rotator (19) connected to a rotational shaft (21) for rotating at the inner side of the housing (17) as shown in FIG. 3. An MR fluid (20) is between the rotator (19) and the inner side of the housing (17). An electromagnet (22) provides a magnetic field to the MR fluid (20).

Figure 4:
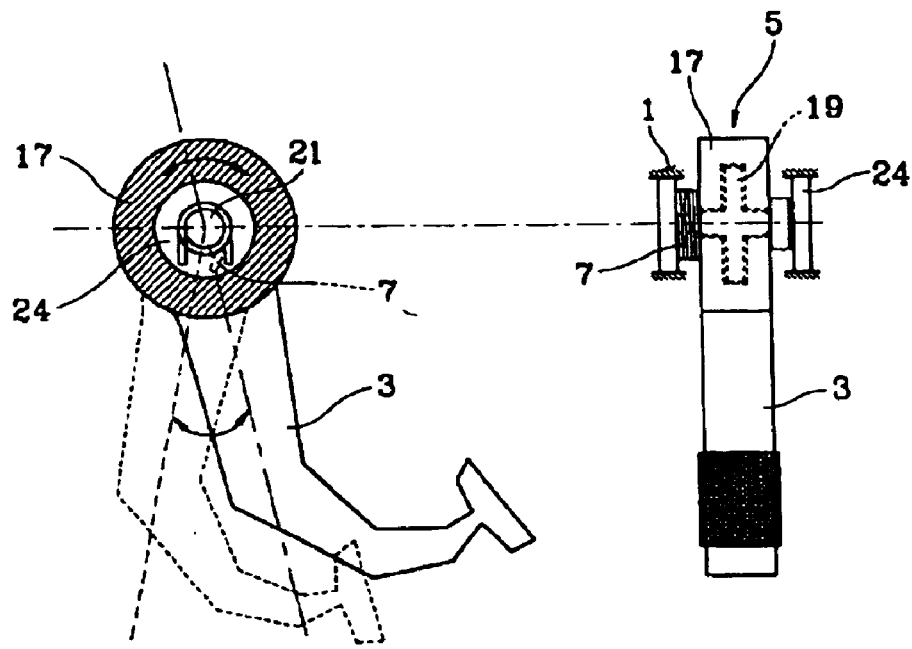
FIGS. 4 and 5 are two embodiments of the present invention according to two different installation figures of an MR damper.
Figure 5:
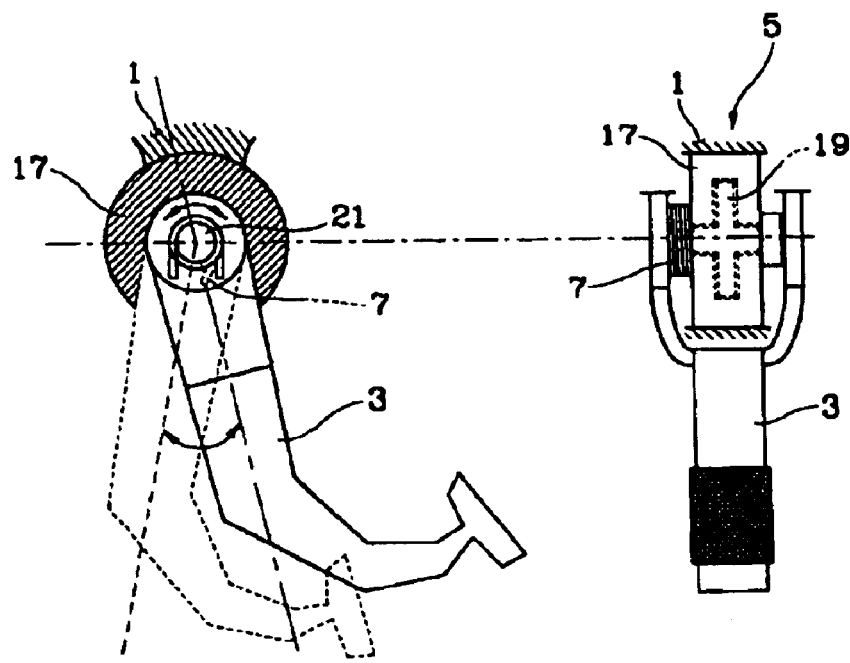

FIGS. 4 and 5 illustrate two different embodiments according to the installation manners of the MR damper (5). In FIG. 4, the housing (17) of the MR damper (5) is integrally rotatably connected to the pedal (3), and the rotational shaft (21) of the rotator (19) is integrally fixed to the base (1) via a mounting bracket (24).

The housing (17) of the MR damper (5) in FIG. 5 is integrally fixed to the base (1), and the rotational shaft (21)

of the rotator (19) is integrally rotatably connected to the pedal (3). In both cases, the rotational displacement of the rotator (19) in relation to the housing (17) of the MR damper (5) is identical to the rotational displacement generated when the pedal (3) pivots in relation to the base (1).

FIG. 6(a) represents that the reaction force is the sum of the reaction force by the torsion spring (7) and the damping force by the MR damper (5) when the driver depresses the pedal (3). Furthermore, the area within the oblique lines depicts a controllable region of the reaction force of the pedal by controlling the MR damper (5).

On the other hand, FIG. 6(b) represents that a force applied to the pedal (3) is the difference between the restoring force by the torsion spring (7) and the damping force by the MR damper (5) when the restoring control of the pedal (3) is carried out without the manipulation of the driver's pedal (3). The area within the oblique lines depicts a controllable region of the reaction force by controlling the MR damper (5).

Figure 6:
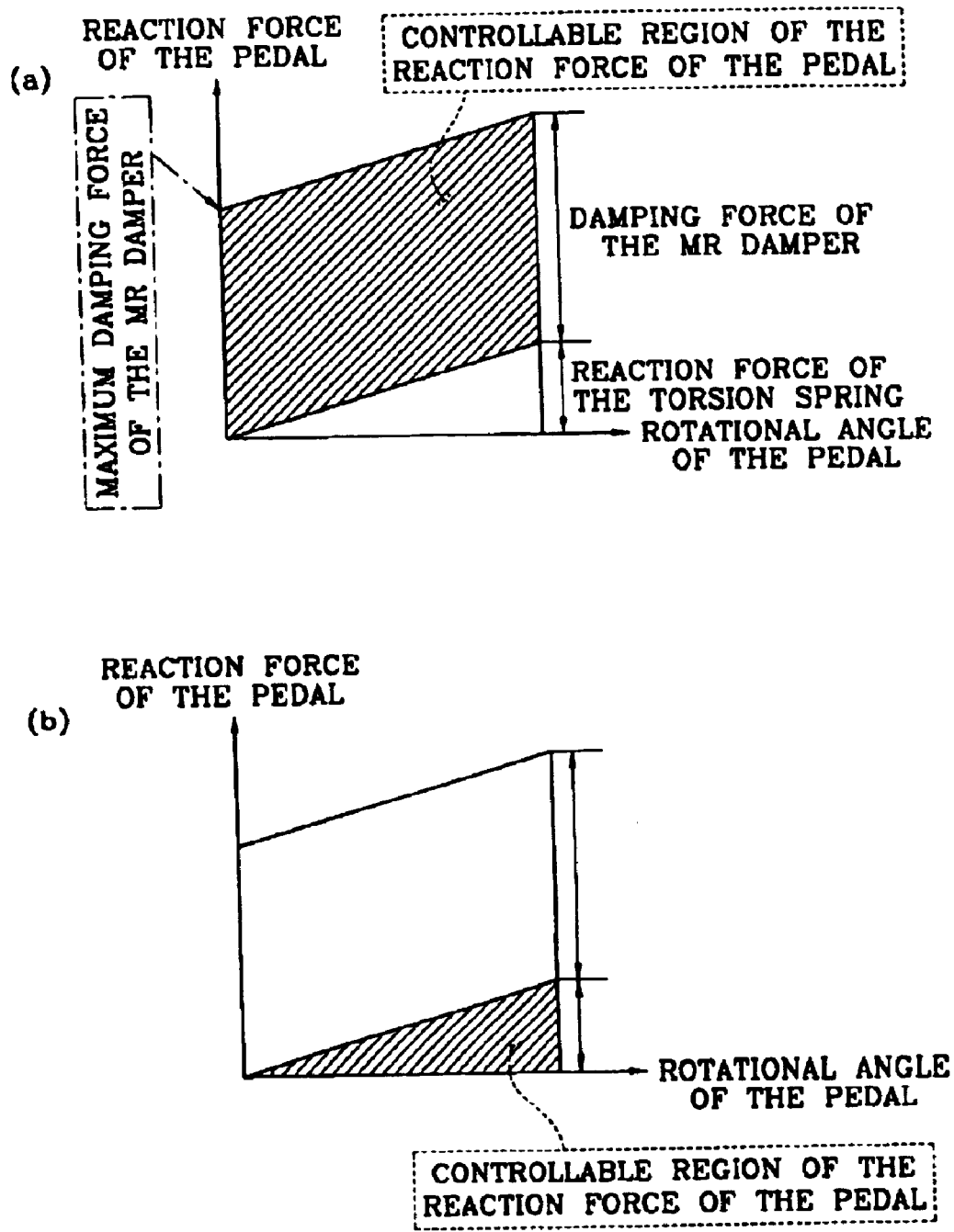
FIG. 6 is graphic representation of controllable regions of reaction force of a pedal simulator according to an embodiment of the present invention.

The reaction force of the pedal (3) can randomly be adjusted within the oblique area of FIG. 6 by an adjustment of the controller (11). As a result, the controllable range of the reaction force of the pedal (3) is relatively wide, and the hysteresis of the reaction force of the pedal required in the pedal simulator can actively be formed by the resilient force provided from the torsion spring (7) and the damping force generated from the MR damper (5).

The damping force generated by the MR fluid by the adjustment of the controller (11) can promptly be changed, thereby enabling a sufficient response of the pedal simulator by the prompt control of the reaction force.

The pedal simulator according to the embodiments of the present invention can be applied to the brake-by-wire system for a vehicle, pedal device for a vehicle simulator, pedal device for an indoor practice driving machine, pedal device for a game player, or the like. That is, the base (1) can be either a vehicle body, vehicle simulator, indoor practice driving machine, a game device, or the like.

As apparent from the foregoing, there is an advantage in the present invention in that the torsion spring is equipped to provide a resilient force toward the opposite direction of the manipulation force of the driver's pedal, and the MR damper is equipped to promptly and actively attenuate the resilient force of the torsion spring and the manipulation force of the driver's pedal, resulting in a wide control range of the reaction force of the pedal and an excellent response, and a proper formation of the hysteresis of the reaction force of the pedal.

What is claimed is:

1. A pedal simulator, comprising:

a base;

a pedal pivotally installed on said base;

a magnetorheological damper between said pedal and said base;

a torsion spring equipped between said pedal and said base;

a rotational angle sensor for measuring a rotational angle of said pedal in relation to said base; and a controller receiving a signal of the rotational angle of said pedal from said rotational angle sensor and adjusting said MR damper.

2. The pedal simulator as defined in claim 1, wherein said controller comprises:

a control part for receiving a signal of said rotational angle sensor and outputting a control signal; and a current regulator for receiving the control signal outputted from said control part and providing a driving current to said MR damper.

3. The pedal simulator as defined in claim 1, wherein said MR damper comprises:

a housing; and a rotator connected to a rotational shaft for rotating at an inner side of said housing.

4. The pedal simulator as defined in claim 3, wherein said housing is integrally rotatably connected to said pedal and said rotational shaft of said rotator is integrally fixed to said base.

5. The pedal simulator as defined in claim 3, wherein said housing is integrally fixed to said base and said rotational shaft of said rotator is integrally rotatably connected to said pedal.

* * * * *